US012687982B2

(12) United States Patent
Eisenstein et al.

(10) Patent No.: US 12,687,982 B2
(45) Date of Patent: Jul. 21, 2026

(54) PRE-VALIDATION OF BLOCKS FOR GARBAGE COLLECTION

(71) Applicant: Sandisk Technologies, Inc., Milpitas, CA (US)

(72) Inventors: Nava Eisenstein, Petach tikwa (IL); Jonathan Journo, Shaarey tikwa (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/664,178

(22) Filed: May 14, 2024

(65) Prior Publication Data

US 2024/0302976 A1 Sep. 12, 2024

Related U.S. Application Data

(62) Division of application No. 17/533,019, filed on Nov. 22, 2021, now Pat. No. 12,019,878.

(51) Int. Cl.

*G06F 3/06* (2006.01)
*G06F 12/1009* (2016.01)

(52) U.S. Cl.

CPC ............ *G06F 3/0652* (2013.01); *G06F 3/061* (2013.01); *G06F 3/0679* (2013.01); *G06F 12/1009* (2013.01)

(58) Field of Classification Search

CPC ............. G06F 12/0246; G06F 12/0253; G06F 12/1009; G06F 2212/7205; G06F 2212/7201; G06F 2212/7209; G06F 2212/1024; G06F 2212/214; G06F 2212/7203; G06F 3/064; G06F 3/0679; G06F 3/0619; G06F 3/0652;

(Continued)

(56) References Cited

U.S. PATENT DOCUMENTS 9,563,382 B2 2/2017 Hahn et al.
10,102,119 B2 10/2018 Gopinath et al.
10,102,135 B2 * 10/2018 Zaretsky ............ G06F 12/0871

(Continued)

FOREIGN PATENT DOCUMENTS

WO 2019113729 A1 6/2019

OTHER PUBLICATIONS

Sanghyuk Jung, et al, 2LGC: An Atomic-Unit Garbage Collection Scheme with a Two-Level List for NAND Flash Storage, 2012, in Proceedings of the International Conference on Embedded Systems, Cyber-physical Systems, and Applications (ESCS), p. 1. The Steering Committee of the World Congress in Computer Science, Computer Engineering and Applied Computing (World Comp).

*Primary Examiner* — Curtis James Kortman
(74) *Attorney, Agent, or Firm* — Patterson + Sheridan, LLP

(57) ABSTRACT

A data storage device includes a memory device and a controller. The controller is configured to select a source block, read metadata associated with the source block and compare to a logical block address to physical block address (L2P) table, determine if a flash management unit (FMU) of the source block is valid, and add a new entry associated with the FMU into a valid FMU buffer when the FMU of the source block is determined to be valid. The controller is further configured to determine that the source block has been fully validated and select a next source block based on a valid counter. The valid counter corresponds to an amount of valid data of the next source block.

9 Claims, 5 Drawing Sheets

(58) Field of Classification Search
CPC ...... G06F 3/0608; G06F 3/0656; G06F 3/061; G06F 11/1072; G06F 11/1068
See application file for complete search history.

(56) References Cited

U.S. PATENT DOCUMENTS

| | | | | |
|---|---|---|---|---|
| 10,901,891 | B2 | 1/2021 | Byun | |
| 10,929,285 | B2 | 2/2021 | R et al. | |
| 10,963,175 | B2 | 3/2021 | Lee | |
| 2014/0032817 | A1 | 1/2014 | Bux et al. | |
| 2017/0123972 | A1* | 5/2017 | Gopinath | G06F 3/0616 |
| 2017/0132125 | A1* | 5/2017 | Cai | G06F 12/0261 |
| 2017/0147502 | A1 | 5/2017 | Byun | |
| 2019/0266079 | A1* | 8/2019 | R | G06F 3/0656 |
| 2022/0342811 | A1* | 10/2022 | Yang | G06F 12/0882 |

* cited by examiner

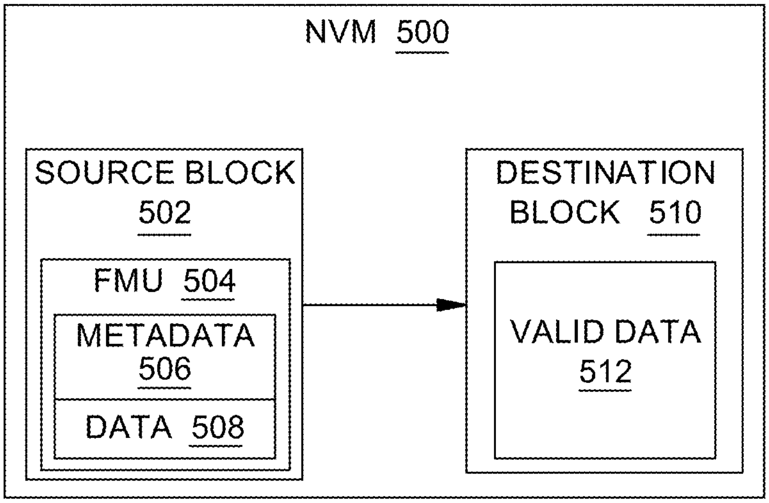
FIG. 5
600
| LBA | PBA |
| --- | --- |
| 0 | 8 |
| 1 | 10 |
| 2 | 12 |
| • • • | • • • |
| n | m |
FIG. 6
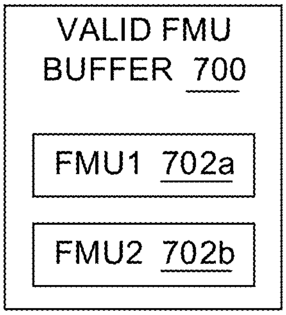
FIG. 7

PRE-VALIDATION OF BLOCKS FOR GARBAGE COLLECTION

CROSS-REFERENCE TO RELATED APPLICATIONS

This application is a divisional of co-pending U.S. patent application Ser. No. 17/533,019, filed Nov. 22, 2021. The aforementioned related patent application is herein incorporated by reference.

BACKGROUND OF THE DISCLOSURE

Field of the Disclosure

Embodiments of the present disclosure generally relate to data storage devices, such as solid state drives (SSDs), and, more specifically, validation of blocks for garbage collection.

Description of the Related Art

During normal data storage device operation, a controller may implement data management operations, such as garbage collection, in order to free memory storage space. Garbage collection frees up storage space by erasing irrelevant data, such as outdated or obsolete data. Garbage collection may be triggered when the free space of the memory device is less than a declared threshold. During the garbage collection process, one or more blocks of the memory device with low amounts of valid data are selected and the valid data is relocated to another one or more blocks. The one or more selected blocks are erased and released to a pool of free blocks, so that the one or more blocks may be programmed in a future write operation.

The garbage collection process includes at least four steps: selecting a source block, scanning a validity of one or more flash management units (FMUs), copying valid data to a destination block, and erasing the source block. Because each FMU needs to be scanned and validated, available data storage device bandwidth is allocated to the garbage collection process, which may decrease overall performance of the data storage device. Furthermore, because the garbage collection process may require an extended period of time to validate the one or more FMUs of the selected source block, the bandwidth allocated to the garbage collection process is unusable to the data storage device, which may cause bottlenecks in data storage device performance.

Therefore, there is a need in the art for an improved data validation process in a data storage device.

SUMMARY OF THE DISCLOSURE

The present disclosure generally relates to data storage devices, such as solid state drives (SSDs), and, more specifically, validation of blocks for garbage collection. A data storage device includes a memory device and a controller. The controller is configured to select a source block, read metadata associated with the source block and compare to a logical block address (LBA) to physical block address (PBA) (L2P) table, determine if a flash management unit (FMU) of the source block is valid, and add a new entry associated with the FMU into a valid FMU buffer when the FMU of the source block is determined to be valid. The controller is further configured to determine that the source block has been fully validated and select a next source block based on a valid counter. The valid counter corresponds to an amount of valid data of the next source block.

In one embodiment, a data storage device includes a memory device and a controller coupled to the memory device. The controller is configured to select a source block, read metadata associated with the source block and compare to a logical block address to physical block address (L2P) table, determine if a flash management unit (FMU) of the source block is valid, and add a new entry associated with the FMU into a valid FMU buffer when the FMU of the source block is determined to be valid.

In another embodiment, a data storage device includes a memory device and a controller coupled to the memory device. The controller is configured to determine that the data storage device is in an idle state, determine if there is an active source block, validate the active source block, determine if there is free space in a valid flash management unit (FMU) buffer, read and check a validity of a next FMU associated with the active source block, and save the next FMU in the valid FMU buffer when the next FMU is valid.

In another embodiment, a data storage device includes memory means and a controller coupled to the memory means. The controller is configured to determine that a garbage collection trigger has been received, determine that one or more source block pre-validations has been completed, re-validate one or more FMUs in a valid FMU buffer when the one or more source block pre-validations has been completed, and perform garbage collection based on the re-validated one or more FMUs.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is an illustration of a non-volatile memory, according to certain embodiments.

FIG. 6 is an illustration of a L2P table, according to certain embodiments.

FIG. 7 is an illustration of a valid FMU buffer, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, validation of blocks for garbage collection. A data storage device includes a memory device and a controller. The controller is configured to select a source block, read metadata associated with the source block and compare to a logical block address to physical block address (L2P) table, determine if a flash management unit (FMU) of the source block is valid, and add a new entry associated with the FMU into a valid FMU buffer when the FMU of the source block is determined to be valid. The controller is further configured to determine that the source block has been fully validated and select a next source block based on a valid counter. The valid counter corresponds to an amount of valid data of the next source block.

Figure 1:
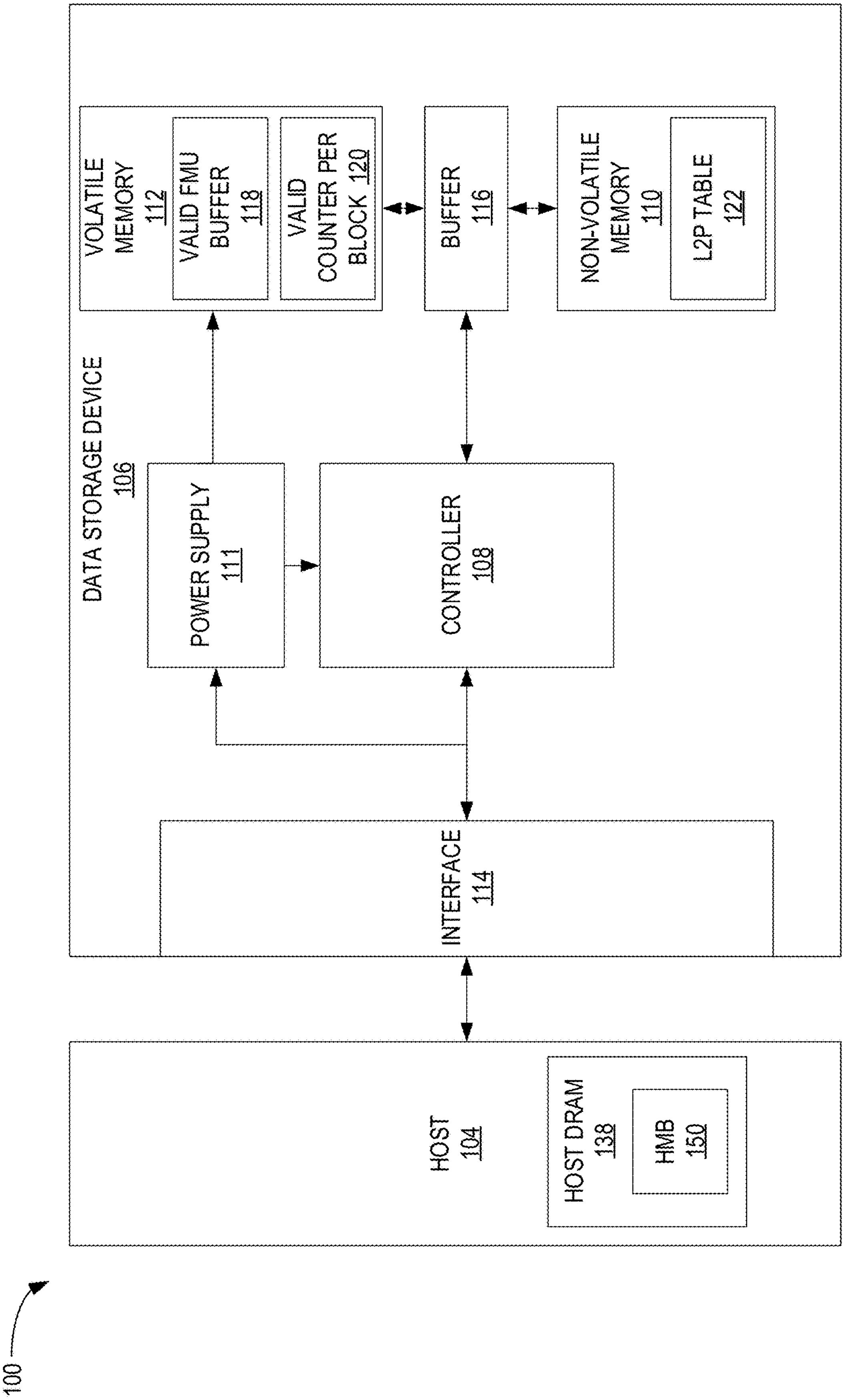
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. Host DRAM 138 includes a host memory buffer (HMB) 150, where the HMB 150 may be utilized by controller 108 for storage of data. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level. A logical-to-physical (L2P) table 122 is stored in the NVM 110.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Volatile memory 112 includes a valid flash management unit (FMU) buffer 118 and stores a valid counter per block unit 120.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
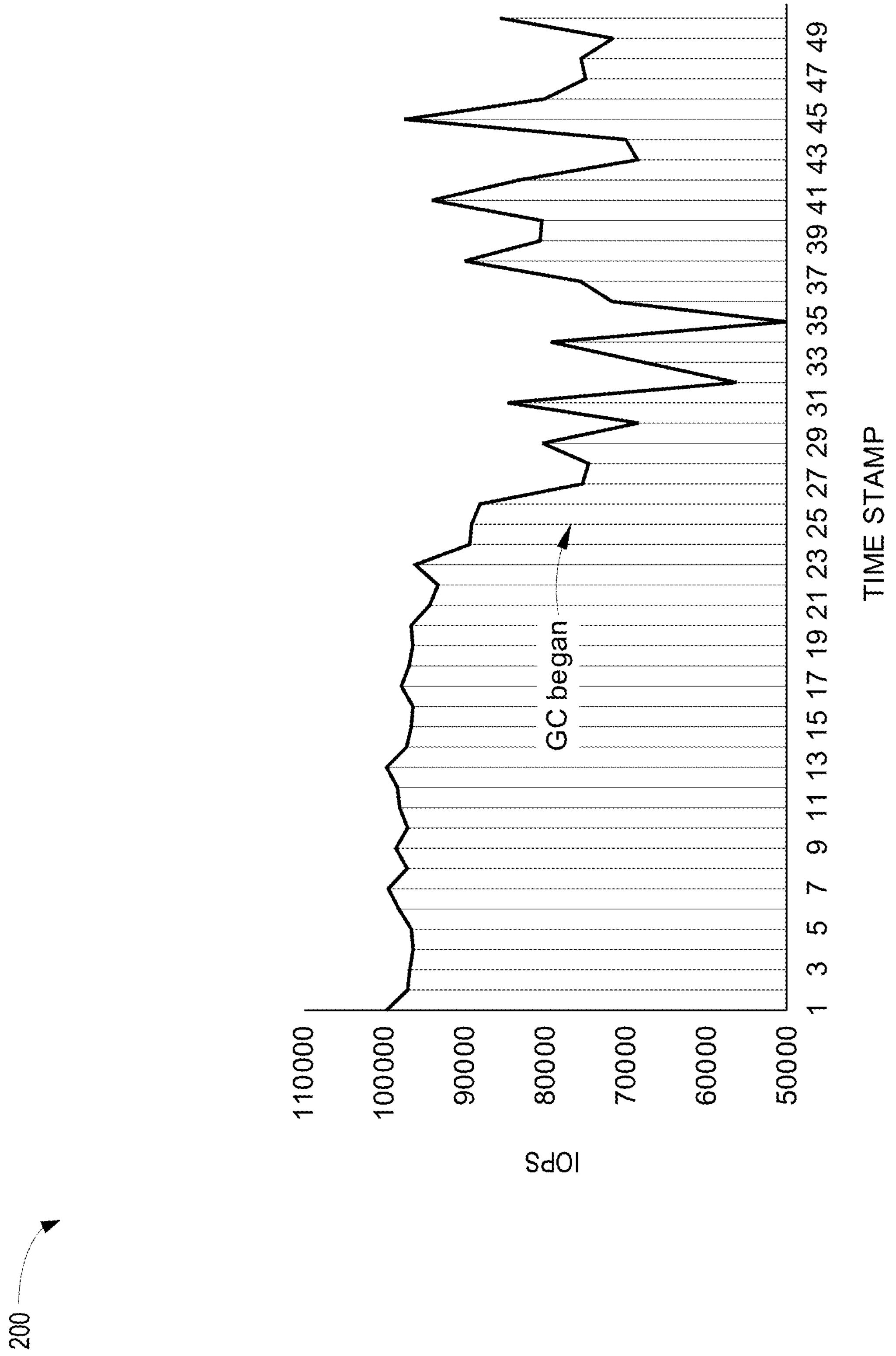
FIG. 2 is an exemplary graph showing a number of input/output (IO) operations per time stamp, according to certain embodiments.

FIG. 2 is an exemplary graph 200 showing a number of input/output (IO) operations per time stamp, according to certain embodiments. IO operations of a data storage device, such as the data storage device 106 of FIG. 1, may range from about 0 operations to upwards above 100,000 operations. The number of IO operations shown in the exemplary graph 200 is for exemplary purposes and is not intended to be limiting.

As shown at time stamp 25, when the garbage collection (GC) operation begins, the IO operations per time stamp decreases significantly as the GC operation requires bandwidth and system resources. During the GC operation, selected source blocks (i.e., the blocks selected for GC) are validated. Because volatile memory, such as the volatile memory 112 of FIG. 1, capacity is limited, a controller, such as the controller 108, may not be able to track obsolete blocks. Rather, only valid counters are stored per block, which may be stored in the valid counter per block unit 120. Thus, in order to determine whether the source block includes valid or invalid data, the metadata of each flash management unit (FMU) of the block is scanned and validated.

The host logical block address (LBA) is compared against a mapping of host LBAs in a storage address table (SAT). In some examples, the SAT may be a LBA to physical block address (PBA) (L2P) table, which may be the L2P table 122 of FIG. 1. If the mapping in the SAT matches the source block address, the relevant FMU data is valid. However, if the mapping in the SAT does not match the source block address, the relevant FMU data is invalid. In some examples, the mapping may be stored in NVM, such as the NVM 110 of FIG. 1. However, storing the mapping in the NVM 110 may require additional read operations to retrieve the mapping data which may, in turn, result in additional overhead. Information for the valid FMUs, such as the valid pointers, are stored in the volatile memory 112, such as SRAM or DRAM, in a valid FMU buffer. When the valid FMU buffer is full, the valid data is copied to a destination block during the GC operation. Furthermore, GC operations may be completed during data storage device 106 or CPU idle time.

In some examples, a host device, such as the host device 104, may include a host memory buffer (HMB) (e.g., HMB 150) in host DRAM, such as the host DRAM 138 of FIG. 1. The HMB is a space of the host DRAM 138 that is allocated to the controller 108, where the controller 108 is able to read from and write to the HMB. Because the controller 108 is able to use the HMB, internal memory of the controller 108, such as DRAM, may be decreased or limited in order to reduce a cost of the data storage device 106 and increase performance of the data storage device 106. However, because the HMB is external to the data storage device 106, HMB access may be slower than internal volatile memory access. Because the validation of FMUs of a storage block requires a long period of time to complete, the performance of the data storage device 106 decreases.

Figure 3:
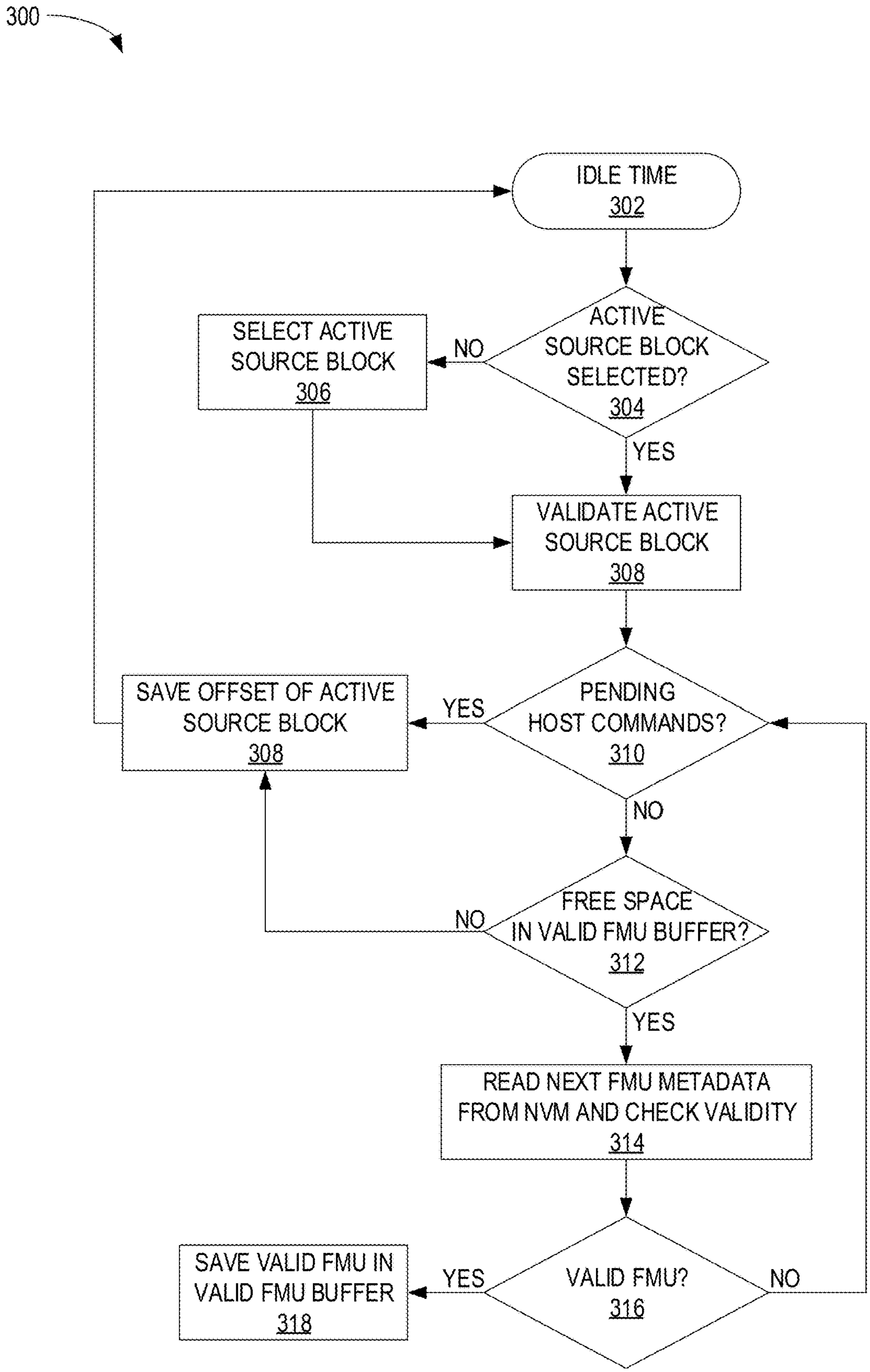
FIG. 3 is a flow diagram illustrating a method of pre-validating flash management units (FMUs), according to certain embodiments.

FIG. 3 is a flow diagram illustrating a method 300 of pre-validating FMUs, according to certain embodiments. Aspects of the storage system 100 of FIG. 1 may be referenced for exemplary purposes and is not intended to be limiting. Method 300 may be executed by the controller 108. Furthermore, references to a central processing unit (CPU) may refer to a processor of the controller 108 or the controller 108 in non-limiting examples. Furthermore, the CPU may be referred to as the controller 108 herein for exemplary purposes.

At block 302, the data storage device 106 enters into an idle state. The idle state may be a low power mode or a period of time where the number of IO operations or data storage device 106 operations decreases below a threshold number. At block 304, the controller 108 determines if an active source block has been selected. If an active source block has not been selected at block 304, the controller 108 selects an active source block at block 306. The selection of an active source block may depend on several factors. For example, the controller 108 may select active source blocks based on a round robin scheme, a program erase count (PEC) of an active source block, a time since last activity of an active source block, a time since closing an active source block, and the like, including combinations of the previously listed factors.

At block 308, the controller 108 validates the selected active source block. During the validation of the selected active source block, the controller 108 reads the relevant metadata for each FMU of the selected active source from the NVM 110 and compares the read relevant metadata against a stored mapping in the SAT.

Entries corresponding to valid FMUs may be stored in a valid FMU buffer, where the valid FMU buffer may be stored in the volatile memory 112. In some examples, the valid FMU buffer may be located in HMB. In other examples, a portion of the valid FMU buffer may be located in the volatile memory 112, such as DRAM or SRAM, of the data storage device 106. When the valid FMU buffer in the volatile memory 112 is full or reaches a threshold, the controller 108 copies the data of the valid FMU buffer in the volatile memory 112 to the HMB. In some examples using the HMB, when a GC operation is triggered, the data in the HMB may be transferred back to the data storage device 106 and stored in the volatile memory 112. Each entry includes a pair of LBA and PBA corresponding to a valid FMU. The controller 108 may dynamically adjust the size of the valid FMU buffer using a valid count (VC) counter of a source block. For example, the size may be determined by scanning a source block, where the source block has worst case scenario of the VC.

At block 310, the controller 108 determines if there are any pending host commands. If there are pending host commands at block 310, then the controller 108 saves an offset of the selected active source block at block 308. The offset may be stored in the volatile memory 112, such as in a DRAM of the controller 108. The offset corresponds to a last read FMU of the selected active source block. When the data storage device 106 enters an idle state at block 302, the pre-validation process may begin again at the previously selected active source block at the FMU corresponding to the stored offset. Thus, the need to re-validate already validated FMUs may be unnecessary. In some examples, the controller 108 may decide to re-validate already validated FMUs due to data storage device 106 conditions.

However, if there are no pending host commands at block 310, then the controller 108 determines if there is free space in the valid FMU buffer at block 312. If there is no free space in the valid FMU buffer at block 312, then the controller 108 saves an offset of the selected active source block at block 308. If the data storage device 106 is still in an idle state and the valid FMU buffer has been emptied due to the valid FMUs being programmed to a destination block, method 300 returns to block 302. However, if there is free space in the valid FMU buffer at block 312, then the controller 108 reads the metadata of the next FMU at 314 and checks the validity of the FMU at 316.

At block 316, the controller 108 determines if the FMU being validated is valid. If the current FMU being validated is found obsolete at block 316, then method 300 returns to block 310 and when method 300 reaches block 314, the next FMU is scanned. However, if the current FMU being validated is found valid at block 316, then the current FMU is stored as a new entry into the valid FMU buffer at 318. By pre-validating source blocks during data storage device 106 idle time, the controller 108 may reference the stored valid FMUs in the valid FMU buffer during a GC operation. Thus, saving time in the GC operation which may decrease the amount of time that data storage device 106 resources are in use for the GC operation. While the data storage device 106 is in the idle state, method 300 may be iterated, where another active source block is selected after fully validating a selected active source block being currently validated.

Figure 4:
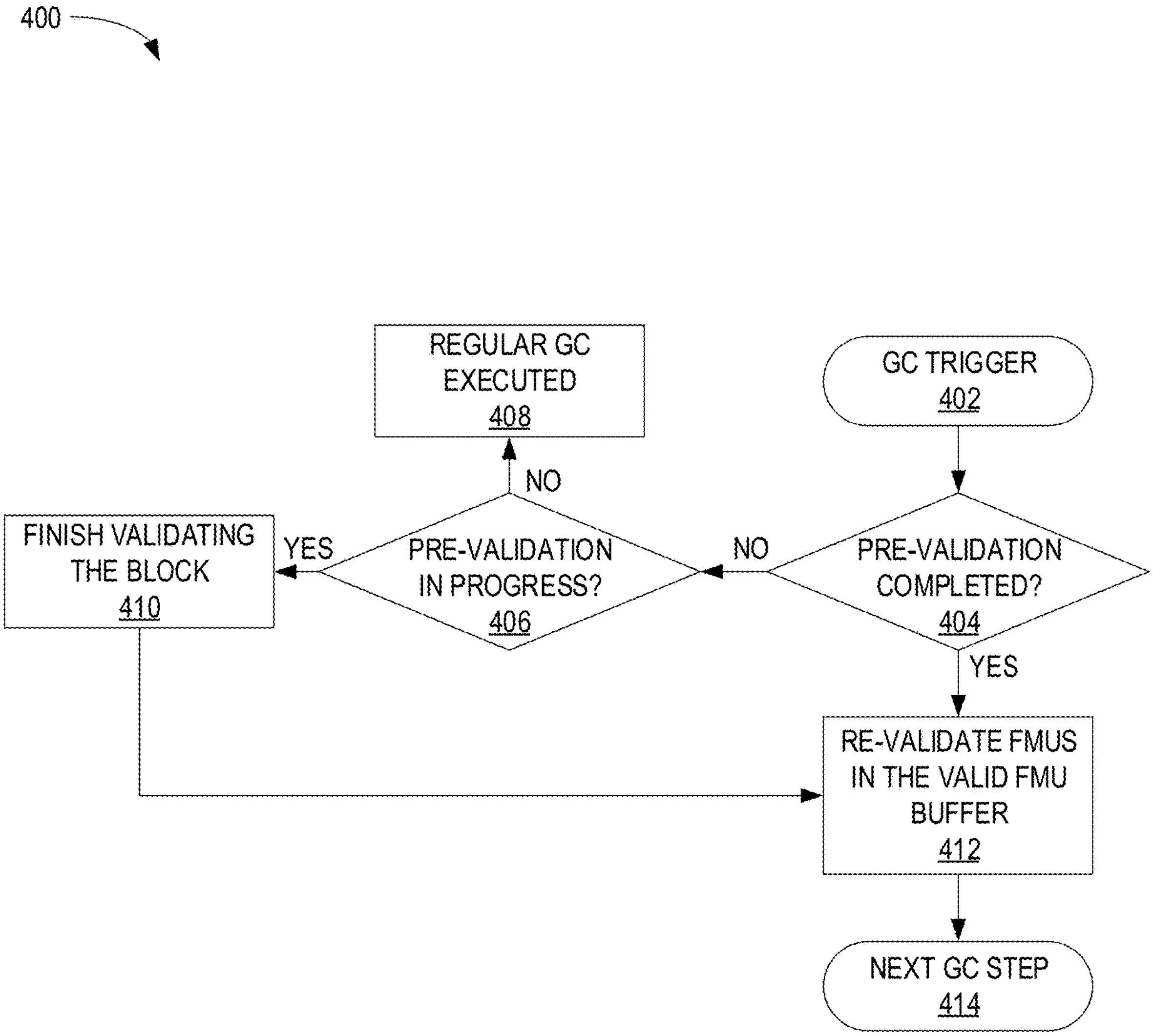
FIG. 4 is a flow diagram illustrating a method of a garbage collection operation including pre-validating FMUs, according to certain embodiments.

FIG. 4 is a flow diagram illustrating a method 400 of a GC operation including pre-validating FMUs, according to certain embodiments. Aspects of the storage system 100 of FIG. 1 may be referenced for exemplary purposes and is not intended to be limiting. Method 400 may be executed by the controller 108. Furthermore, references to a central processing unit (CPU) may refer to a processor of the controller 108 or the controller 108 in non-limiting examples. Furthermore, the CPU may be referred to as the controller 108 herein for exemplary purposes.

At block 402, GC is triggered. GC may be triggered due to a free space threshold being reached (e.g., the amount of free space is less than a threshold value). At block 404, the controller 108 determines if a pre-validation operation, such as method 300, has been completed for an active source block. If a pre-validation operation has not been completed at block 404, then the controller 108 determines if there is a pre-validation operation in progress at block 406. If there is not a pre-validation operation in progress at block 406, then a normal GC operation is executed at block 408. However, if there is a pre-validation in progress at block 406, then the controller 108 finishes validating the selected active source block at block 410.

At block 412, the controller 108 re-validates the FMUs stored in the valid FMU buffer. Because the number of FMUs stored in the valid FMU buffer is less than a total number of FMUs associated with the active source blocks corresponding to valid FMUs in the valid FMU buffer, a shorter re-validation operation is executed. In other words, less FMUs, when compared to a normal GC operation, is needed to be validated since the FMUs stored in the valid FMU buffer has already been validated at least once. The LBAs corresponding to the FMUs in the valid FMU buffer are translated in SAT. In some examples, the metadata associated with the FMUs stored in the valid FMU buffer are not read since the LBA and JBA of the valid FMUs are stored as entries in the valid FMU buffer. If the JBA in the SAT is the same as the JBA corresponding to the LBA in the valid FMU buffer, then the FMU is valid and the controller 108 copies the data to a destination block. At block 414, method 400 continues to the next GC step, which may be the copying of valid FMUs to a destination block.

FIG. 5 is an illustration of an NVM 500, according to certain embodiments. NVM 500 may be the NVM 110 of FIG. 1. NVM 500 includes a source block 502 and a destination block 510. The source block 502 and the destination block 510 may each be one of a plurality of blocks of the NVM 500. The source block 502 includes an FMU 504.

The FMU 504 includes metadata 506 and data 508, where the metadata 506 is associated with the data 508.

FIG. 6 is an illustration of a L2P table 600, according to certain embodiments. L2P table 600 illustrates an exemplary LBA to PBA mapping, where LBA 0 is mapped to PBA 8, LBA 1 is mapped to PBA 10, and so-forth.

FIG. 7 is an illustration of a valid FMU buffer 700, according to certain embodiments. Valid FMU buffer 700 includes valid FMUs validated using method 300 of FIG. 3. Valid FMU buffer 700 illustrates an example where FMU 1 702*a* and FMU 2 702*b* are pre-validated using method 300 and are stored in the valid FMU buffer 700.

By pre-validating source blocks during data storage device idle time, the overall number of FMUs needing to be validated during a garbage collection operation may be decreased. Thus, the garbage collection operation may be take less time than a garbage collection operation without pre-validation of FMUs and the performance of the data storage device may be improved.

In one embodiment, a data storage device includes a memory device and a controller coupled to the memory device. The controller is configured to select a source block, read metadata associated with the source block and compare to a logical block address to physical block address (L2P) table, determine if a flash management unit (FMU) of the source block is valid, and add a new entry associated with the FMU into a valid FMU buffer when the FMU of the source block is determined to be valid.

The source block is selected based on a valid counter. The valid counter corresponds to an amount of valid data of the source block. The selected source block has a minimum valid counter compared to a valid counter of other source blocks. The selected source block has a first amount of valid data and the other source blocks each has a second amount of valid data. The first amount of valid data is less than the second amount of valid data. The controller is further configured to select the source block when the data storage device enters an idle state. The controller is further configured to scan a next FMU when the FMU is determined to be obsolete. The controller is further configured to determine that the source block has been fully validated and select a next source block. The controller is further configured to refer to the valid FMU buffer when performing garbage collection. During garbage collection, only FMUs stored in the valid FMU buffer are re-validated. The valid FMU buffer is stored in host memory buffer (HMB).

In another embodiment, a data storage device includes a memory device and a controller coupled to the memory device. The controller is configured to determine that the data storage device is in an idle state, determine if there is an active source block, validate the active source block, determine if there is free space in a valid flash management unit (FMU) buffer, read and check a validity of a next FMU associated with the active source block, and save the next FMU in the valid FMU buffer when the next FMU is valid.

The controller is further configured to determine if there any pending host commands for the active source block after the validating and before the determining if there is free space. The controller is further configured to save an offset of the active source block in a buffer when there is a pending host command. The validating the source block is paused when there is pending host command. The offset corresponds to a last FMU of the active source block validated. The controller is further configured to resume validating the active source block at the offset when there are no more pending host commands. The controller is further configured to save an offset of the active source block in a buffer when there is no free space in the FMU buffer. The offset corresponds to a last FMU of the active source block validated. The controller is further configured to resume validating the active source block at the offset when there is free space in the FMU buffer. The controller is further configured to determine if there are any pending host commands when the next FMU is not valid.

In another embodiment, a data storage device includes memory means and a controller coupled to the memory means. The controller is configured to determine that a garbage collection trigger has been received, determine that one or more source block pre-validations has been completed, re-validate one or more FMUs in a valid FMU buffer when the one or more source block pre-validations has been completed, and perform garbage collection based on the re-validated one or more FMUs.

The one or more FMUs are re-validated without reading metadata associated with the one or more FMUs from the memory means. The controller is further configured to determine if there is a pre-validation operation in progress when the one or more source block pre-validations has not been completed. The controller is further configured to complete the pre-validation operation in progress and re-validate the one or more FMUs without reading metadata associated with the one or more FMUs from the memory means when the pre-validation operation in progress is completed.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
- a memory device; and
- a controller coupled to the memory device, the controller configured to:
  - select a source block;
  - determine if a flash management unit (FMU) of the source block is valid;
  - add a new entry corresponding to the FMU into a valid FMU buffer when the FMU of the source block is determined to be valid, wherein the new entry comprises data associated with the valid FMU;
  - determine if a pre-validation operation has been completed for the source block;
  - perform at least one garbage collection operation utilizing the valid FMU buffer;
  - adjust a size of the valid FMU buffer using a valid count (VC) counter of the source block; and
  - re-validate the FMU.

2. The data storage device of claim 1, wherein performing the at least one garbage collection operation is triggered based on exceeding a free space threshold.

3. The data storage device of claim 1, wherein, during the at least one garbage collection operation, only FMUs identified in associated entries in the valid FMU buffer are re-validated.

4. The data storage device of claim 1, wherein the controller is further configured to determine if there is a pre-validation operation in progress for the source block.

5. The data storage device of claim 4, wherein the at least one garbage collection operation utilizing the valid FMU buffer is performed when no pre-validation operation is in progress for the source block.

6. The data storage device of claim 1, where the at least one garbage collection operation comprises a first garbage collection operation and a second garbage collection operation, wherein the second garbage collection operation utilizes the valid FMU buffer and the second garbage collection operation is performed in response to determining there is a pre-validation operation in progress and after the pre-validation operation is completed.

7. The data storage device of claim 6, wherein, during the first garbage collection operation, a first number of FMUs need to be validated; and during the second garbage collection operation, a second number of FMUs need to be re-validated, the second number of FMUs being less than a total number of FMUs associated with the source block corresponding to valid FMUs in the valid FMU buffer.

8. The data storage device of claim 7, wherein the second number of FMUs needing to be re-validated is less than the first number of FMUs needing to be validated.

9. The data storage device of claim 1, wherein data associated with valid FMUs of the valid FMU buffer are relocated from the source block to a destination block during the at least one garbage collection operation.

* * * * *